ADJUSTABLE ROTARY ORIFICE

Filed Nov. 6, 1963 2 Sheets-Sheet 1

Inventor:
Willard A. Kates
By: Hofgren, Wegner, Allen, Stellman & McCord
Attorneys Dec. 27, 1966 W. A. KATES 3,294,361
ADJUSTABLE ROTARY ORIFICE
Filed Nov. 6, 1963 2 Sheets-Sheet 2
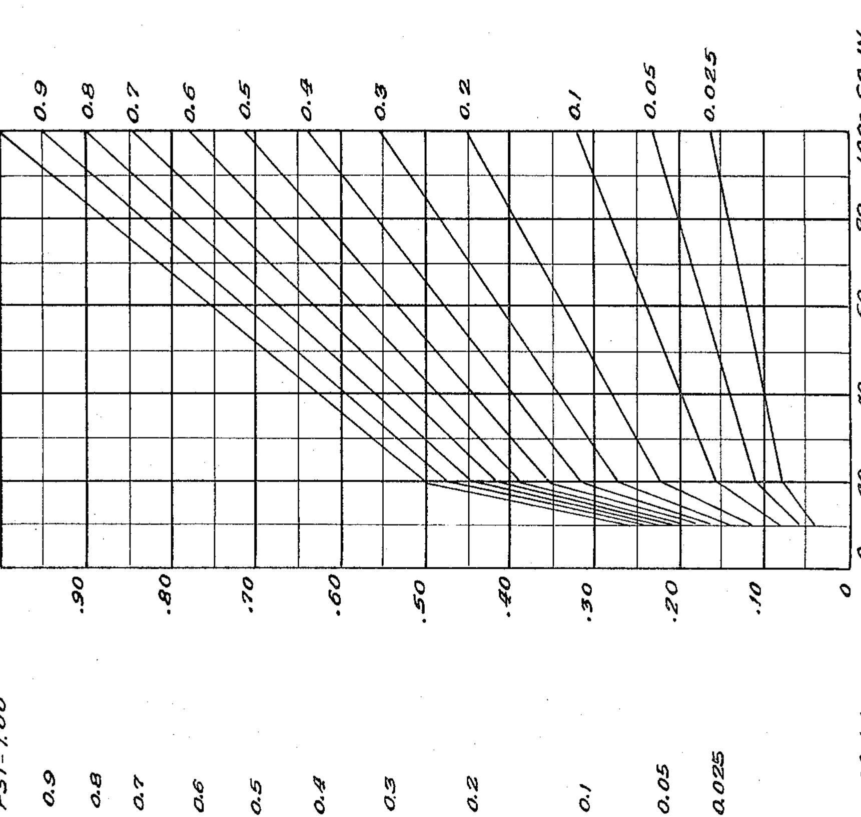
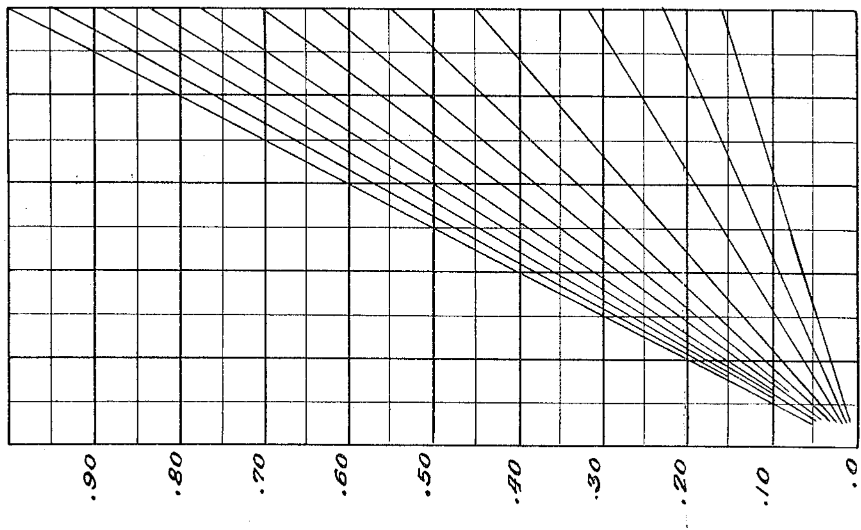

United States Patent Office 3,294,361
Patented Dec. 27, 1966

3,294,361

ADJUSTABLE ROTARY ORIFICE

Willard A. Kates, Deerfield, Ill., assignor to The W. A. Kates Company, a corporation of Illinois Filed Nov. 6, 1963, Ser. No. 321,910
3 Claims. (Cl. 251—208)

This invention relates to flow sensing devices and more particularly to a device for varying the size of a restrictive orifice in a conduit to obtain more accurate flow readings therefrom.

A common way of measuring the fluid flow in a conduit is by sensing pressure drop across a restrictive orifice positioned in the path of the fluid flow. By taking a reading on either side of the orifice and comparing the same, the rate of flow can be determined through instrumentation programmed for known formulas for this purpose. Such pressure sensing instruments usually operate most accurately within a given pressure differential range. Thus, it is desirable to maintain a pressure differential on either side of the orifice within these limitations for optimum performance of the sensing instruments. There are well known devices which feature interchangeable orifice plates so that this given differential pressure may be maintained. Such devices permit only a limited number of pressure differentials to be created as a result of the limited number of plates which can be interchanged. The process of changing the plates is relatively laborious and time consuming and requires that the flow through the conduit be interrupted while the change is made.

It is the purview of this invention to provide an infinitely variable orifice which can be easily adjusted to an infinite number of settings to the end of maintaining a pressure differential on either side of the orifice within a given range so that the sensing instruments being used to sense the fluid flow may operate within their optimum capabilities. Also, the orifice means provided by this invention may be adjusted without interrupting fluid flow and without the need for tools.

It is therefore a general object of this invention to provide a new and improved variable flow control device.

It is a primary object of this invention to provide a new and improved flow control device which is easily adjusted to an infinite number of variable orifice sizes.

It is another object of this invention to provide a new and improved method of operating flow sensing instruments within an optimum pressure differential range therefor.

It is still another object of this invention to provide a new and improved flow control device with means for maintaining the pressure on either side of the device within a given range so that sensing instruments used therewith may operate within their optimum capabilities.

It is a further object of this invention to provide a new and improved variable flow control means for a liquid conduit including an orifice device capable of manual adjustment to an infinite number of different sized orifice openings for maintaining the pressure differential on either side of the orifice within a given range for optimum performance of sensing instruments used therewith.

Further objects and advantages will become apparent from the following detailed description taken in connection with the accompanying drawings, in which:

FIGURE 1 is a section view of the flow control device of this invention;

FIGURE 5 is a graphical representation of flow conditions obtained with the orifice sleeve shown in FIGURE 3; and FIGURE 6 is a graphical represenation of the flow conditions achieved with the orifice sleeve shown in FIGURE 4.

Figures 2, 3, 4:
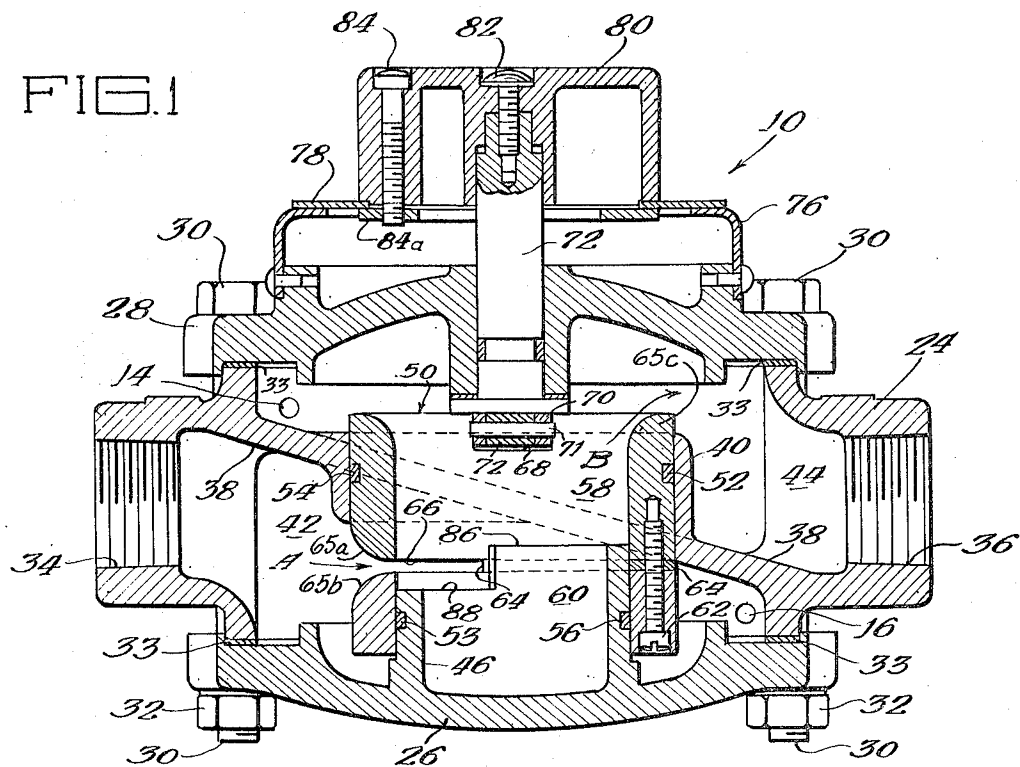
FIGURE 2 is a diagrammatic illustration of the flow control device of this invention in use in a conduit for sensing the pressure differential on either side thereof.
FIGURE 3 is a section view of the orifice sleeve of this invention.
FIGURE 4 is a section view of a modified orifice sleeve of this invention.

While this invention is susceptible of embodiment in many different forms, there is shown in the drawings and will herein be described in detail several embodiments of the invention with the understanding that the present disclosure is to be considered as an exemplification of the principles of the invention and is not intended to limit the invention to the embodiment illustrated. The scope of the invention will be pointed out in the appended claims.

The adjustable orifice device 10 of this invention is intended for use in the conduit line 12. Openings 14 and 16 are located upstream and downstream in the housing to sense the pressure of fluid flowing through the conduit at these two points. This information is transmitted by conduits 18 and 20 to a measuring device 22 which compares the two readings and, by means of appropriate programming, gives a reading as to the rate of flow through the conduit.

The flow control device 10 includes a main body portion 24, a bottom cap 26 and top cap 28 which are held together as a unit by suitable means, such as tie bolts 30 and tie nuts 32. Gaskets, such as 33, may be interposed between the caps and the body to form a fluid-tight seal. The body is provided with a threaded inlet port 34 and a threaded outlet port 36 for facilitating its connection in a conduit line 12.

In the body of the flow control device of this invention there is provided a generally diagonally extending wall 38 having a circular cylindrical portion 40 intermediate the ends thereof which divides the interior of the body into a generally aligned inlet chamber 42 and outlet chamber 44 and establishes communication therebetween. The circular cylindrical portion 40 is preferably formed about an axis substantially transverse to the axis of the inlet 34 and outlet 36 and upright relative thereto.

The bottom cap is provided with a generally upstanding hollow circular cylindrical orifice cylinder or boss 46 which is formed substantially coaxially with the cylinder 40. The outer diameter of the cylinder 46 is preferably smaller than the inner diameter of the cylinder 40 for accommodating an orifice sleeve means 50 therebetween.

The orifice sleeve 50 preferably has an outer diameter substantially coextensive with the inner diameter of the cylinder 40 and an inner diameter substantially coextensive with the outer diameter of the cylinder 46 so that it is positioned generally coaxially with respect to both cylinders, rotatable within one and about the periphery of the other. Suitable O-rings, such as 52 and 53 are provided for providing a seal between the cylinders and the orifice sleeve. To this end, the orifice is provided with a circumferential groove 54 on the periphery thereof in which the O-ring 52 is lodged for sealing between the orifice sleeve 50 and the interior of the cylinder 40. Similarly, the periphery of the cylinder 46 is provided with a groove 56 in which the O-ring 53 is positioned for sealing between the periphery of the cylinder 46 and the internal diameter of the orifice sleeve 50.

The orifice sleeve 50 includes a top portion 58 and bottom portion 60 which are fastened together as a unit by suitable means, such as a threaded fastener 62. A shim 64 is positioned therebetween to seal a portion of the juncture between the top and bottom. The remaining space between the two members 58 and 60 which is not filled by the shim 64 forms a circumferential slot 66 facing inlet 34, having rounded upper and lower edges 65*a* and 65*b* and having a length many times its width. Fluid entering through the inlet 34 passes from the chamber 42 by way of the interior of the sleeve 50, over rounded edge 56*c* to the chamber 44 and out the outlet 36.

The top portion 58 of the sleeve 50 is provided with a transverse groove 68 for accommodating an arm 70 which is secured by means, such as a pin 71, to the bottom of a shaft 22 which is positioned in the cap generally coaxially with the axis of the sleeve 50 and cylinders 40 and 46. Mounted on the top of the housing is the indicator cap 76, having an index line thereon (not shown). An indicia bearing disc 78 overlies the cap and is secured to a turning knob 80, which is fastened to the shaft by suitable means, such as a screw 82. The turning knob 80 may be fastened to the disc 78 by suitable screws, such as 84, which are secured in the ring nut 84*a* to clamp the disc 78 therebetween. The knob 80 may be turned to align the indicia on the disc with the index on the cap 76 and to turn the orifice sleeve 50 relative to the cylinders 40 and 46 to predictably adjust the size of the opening of the orifice.

The cylinder 46 is provided with an upstanding flange portion 86 which extends approximately half-way around the free end thereof. This flange portion is of a sufficient height to extend above the slot portion 66 of the orifice sleeve 50. The lower portion 88 of the free end of the sleeve 46 terminates at a point below the slot 66. By rotating the sleeve 50 relative to the cylinders 40 and 46 so that a portion of the slot is juxtaposed over the portion 86 of the flange the size of the opening of the slot may be changed. There are an infinite number of positions to which the sleeve can be rotated between those positions in which the slot opening is fully open and completely closed. Each intermediate position provides a different sized opening through the slot and, therefore, results in a different pressure differential on either side of the slot for any given rate of flow. This infinite number of different sized openings may be produced by the mere manual turning of the adjusting knob and without the need for interrupting fluid flow through the conduit. The need for changing the orifice sleeve itself is eliminated as well as the attendant time and labor customary when changing orifice plates.

The indicia bearing surface 78 on the dial cap 76 may be provided with appropriate indicia needed for determining the correct setting to be used depending upon the flow conditions of the conduit. Knowing the pressure differential range within which the sensing instruments operate at optimum capability, and knowing the approximate rate of the flow of fluid through the conduit, the knob can be turned to rotate the orifice sleeve to produce an opening of a size which will cause a pressure drop thereacross within the optimum range limitation of the sensing instruments and further metered until the sleeve is precisely positioned for the rate of flow in the conduit. Thus this invention provides a flow sensing device which is manually adjustable to produce an infinite number of orifice openings by the mere turning of a dial so that pressure sensitive instruments used with the device may operate within an optimum range of conditions.

In FIGURE 4, there is shown a modified orifice sleeve 50*a* similar to the sleeve 50 having a top portion 58*a* and a bottom portion 60*a* and an orifice slot 66*a* therein. Also, a similar circumferential groove 54*a* is provided as well as the slot 68*a*. However, in the orifice sleeve 50*a*, the top portion 58*a* is provided with an enlarged recess 67 at the bottom end thereof and the bottom portion 60*a* is provided with a similar mating enlarged recess 67' at the top end thereof so that when the top and bottom portions are fastened together as a unit to form the sleeve 50*a* these two recess portions form an enlarged portion 67*a* of the orifice 66*a*. When the portion 67*a* is added to the portion 66*a* the total area of the orifice is greatly enlarged. The relatively small portion 67*a* may effectively double the area of the slot 66*a*. When a sleeve, such as 50*a*, is rotated from a fully closed position to completely expose the portion 67*a* within a relatively few degrees of turning movement approximately half of the orifice area may be exposed. Reference to the charts in FIGURE 5 and FIGURE 6 will explain the advantages of this feature.

The relationship of the area of the exposed slot 56 to the flow rate and pressure differential across the slot may be easily plotted. The chart in FIGURE 5 is a graphical presentation of the aforedescribed relationship with the orifice sleeve as shown in FIGURE 3. The ordinate scale at the left represents flow rate and the number 1 can represent any desired flow rate with the decimal values therebelow representing that percentage of the flow rate. The horizontal scale at the bottom of the chart may represent indicia on the dial 78 which may correspond to the size of the opening of the slot 66. The diagonal lines represent the pressure differential across the orifice at a given flow rate and at a given orifice setting. With such a chart and with the device of this invention it is easy to set the orifice sleeve so that the sensing instruments will operate within their optimum pressure differential range limitations. In some instances the approximate rate of flow will be known and an initial dial reading may be correspondingly set in. In those situations where the approximate rate of flow is not initially known then any dial setting will still given a reading on the sensing means of the approximate rate of flow, even though the sensing means may be operating at a pressure differential which is outside of its range for maximum accuracy. For example, given sensing instruments which operate most accurately within a pressure differential of approximately 0.1 and knowing initially that the rate of flow is approximately .25, the orifice sleeve can be turned to a dial reading of .8, indicating that approximately 80% of the total area of the orifice slot is exposed to permit fluid flow therethrough. Reference to the chart, FIGURE 5, shows that at a rate of flow of .25 with the sleeve turned to a position of .8, the pressure differential across the slot will be 0.1. In this manner the sleeve may be easily positioned so that the sensing instruments can operate under optimum conditions.

FIGURE 6 is a graph similar to FIGURE 5 but plots the flow conditions relative to an orifice sleeve having the enlarged portion 67*a* as shown in FIGURE 4. Instead of the uniform orifice width as found in the sleeve of FIGURE 3 and charted in FIGURE 5, the orifice sleeve in FIGURE 4 has a slot with approximately 50% of the total area thereof exposed in the first 20% of turning movement. The chart shown in FIGURE 6 illustrates how increased accuracy can result from such a construction. Because the diagonal lines beyond the point of 20° rotation are more horizontal than those in FIGURE 5, it can be readily seen that an error in setting the dial will given substantially smaller deviation in pressure differential than would occur with the use of an orifice sleeve having uniform orifice width. It is obvious that diagrams similar to that shown in FIGURE 6 can be drawn for other orifice sleeves having orifices of greater or smaller enlarged recesses and at different percentages of complete orifice openings. Using the device of this invention with such charts as shown in FIGURES 5 and 6, it is readily apparent that the appropriate adjustment may easily be made to maintain the pressure differential within a given range limitation to insure the maximum accuracy of the sensing instruments.

This invention provides a flow control device which may be easily and quickly adjusted to change the size of the orifice and thereby change the pressure differential thereacross for any given rate of flow. Because the orifice is a long thin slot having a length many times its width, the plot of the pressure differential thereacross for any given sized opening and any given rate of flow produces a straight line graphical presentation. Thus, in addition to affording an easily adjustable infinitely variable orifice, this invention further enable the orifice to be accurately adjusted, with the aid of suitable charts, to obtain a desired pressure differential thereacross for a given rate of flow to the end that the sensing instruments being used to measure flow rate may operate within the optimum range of pressure differential.

I claim:

1. An adjustable flow regulating apparatus for use with sensing instruments and sensing pressure differential in a conduit to determine the rate of fluid flow therein, comprising: a housing having generally axially aligned inlet and outlet passages connected to the fluid conduit to permit the flow of fluid therethrough; a partition extending transversely across the axes of the inlet and outlet passages to divide the interior of the housing into an inlet and outlet chamber, said partition having an intermediate cylindrical surface formed on an axis generally normal to the combined axes of the inlet and outlet passages; an upstanding boss in the housing generally concentric with the cylinder formed in the housing partition, said boss having means generally defining a transverse slot therein; and a sleeve generally concentrically within the cylinder and concentrically about the boss and having an elongated narrow slit formed therein in general alignment with the slot formed in the boss, said sleeve being mounted for rotation relative to the boss and to the cylinder to change the size of opening existing through the partition defined by the cooperating slit of the sleeve and slot of the boss, whereby fluid entering the inlet is channeled through the opening defined by the sleeve and boss and passes outwardly through the sleeve to the outlet passage and into the remainder of the conduit.

2. The flow regulating apparatus of claim 1 wherein the boss has a peripheral flanged portion of greater axial extent than the remainder of the boss, said remainder portion forming the fluid slot therethrough.

3. The adjustable flow regulating apparatus of claim 2 wherein the partition extends diagonally across the axially aligned inlet and outlet passages.

References Cited by the Examiner

UNITED STATES PATENTS

| | | | |
|---|---|---|---|
| 1,362,302 | 12/1920 | Hansen | 251—208 X |
| 1,682,602 | 8/1928 | Dawley | 73—205 |
| 2,628,588 | 2/1953 | Mehler | 251—208 X |
| 3,100,620 | 8/1963 | Kates | 251—208 |
| 3,162,736 | 12/1964 | Turner | 251—208 |
| 3,207,181 | 9/1965 | Willis | 251—208 X |

ALAN COHAN, *Primary Examiner.*

H. W. WEAKLEY, *Examiner.*